US011996941B2

(12) United States Patent
Huang et al.

(10) Patent No.: US 11,996,941 B2
(45) Date of Patent: May 28, 2024

(54) TECHNIQUES FOR PROVIDING DEDICATED DEMODULATION REFERENCE SIGNALS FOR TRANSMISSION REPETITIONS

(71) Applicant: QUALCOMM Incorporated, San Diego, CA (US)

(72) Inventors: Yi Huang, San Diego, CA (US); Wei Yang, San Diego, CA (US); Seyedkianoush Hosseini, San Diego, CA (US); Gokul Sridharan, Sunnyvale, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 17/471,075

(22) Filed: Sep. 9, 2021

(65) Prior Publication Data

US 2022/0085915 A1 Mar. 17, 2022

Related U.S. Application Data

(60) Provisional application No. 63/077,399, filed on Sep. 11, 2020.

(51) Int. Cl.
*H04L 1/08* (2006.01)
*H04L 5/00* (2006.01)

(52) U.S. Cl.
CPC .............. *H04L 1/08* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 2019/0149365 A1* | 5/2019 | Chatterjee | H04L 25/0226 370/329 |
| 2019/0230689 A1* | 7/2019 | Cao | H04L 27/2602 |
| 2019/0313436 A1* | 10/2019 | Lee | H04W 72/1268 |
| 2020/0052828 A1* | 2/2020 | Wang | H04L 1/188 |
| 2020/0267756 A1* | 8/2020 | Fakoorian | H04W 72/23 |
| 2021/0014890 A1* | 1/2021 | Deogun | H04W 72/23 |
| 2021/0367732 A1* | 11/2021 | Salim | H04W 72/20 |
| 2021/0377937 A1* | 12/2021 | Takeda | H04W 72/20 |
| 2022/0038893 A1* | 2/2022 | Narasimha | G06F 21/602 |

(Continued)

FOREIGN PATENT DOCUMENTS

| | | |
|---|---|---|
| EP | 3910851 A1 | 11/2021 |
| WO | 2020145769 A1 | 7/2020 |

OTHER PUBLICATIONS

International Search Report and Written Opinion—PCT/US2021/049858—ISA/EPO—dated Feb. 28, 2022.

(Continued)

*Primary Examiner* — Otis L Thompson, Jr.
(74) *Attorney, Agent, or Firm* — Arent Fox Schiff LLP

(57) ABSTRACT

Aspects described herein relate to providing demodulation reference signal (DMRS) transmissions for channel transmission repetitions. This can include defining DMRS patterns for channel transmission repetitions having a symbol length that is less than a threshold, dropping or deferring channel transmission repetitions that are mapped to a set of uplink symbols that are less than a threshold symbol length, and/or the like.

8 Claims, 9 Drawing Sheets

(56) References Cited

U.S. PATENT DOCUMENTS

| | | | |
|---|---|---|---|
| 2022/0046671 A1* | 2/2022 | Yang | H04L 5/0078 |
| 2022/0070892 A1* | 3/2022 | Xu | H04W 72/1268 |
| 2022/0086823 A1* | 3/2022 | Huang | H04W 72/0446 |
| 2022/0150924 A1* | 5/2022 | Gao | H04L 1/189 |
| 2022/0287073 A1* | 9/2022 | Wong | H04L 1/08 |

OTHER PUBLICATIONS

LG Electronics: "PUSCH Enhancements for NR URLLC", 3GPP Draft, R1-1908543, 3GPP TSG RAN WG1 #98, PUSCH Enhancements for NR URLLC, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051765151, 13 Pages, Retrieved from the Internet: URL:http://www.3gpp.org/ftp/tsg_ran/WG1_RL1/TSGR1_98/Docs/R1-1908543.zip [retrieved on Aug. 17, 2019] Sections 1, 2.3, 2.4.4, 2.4.5.
Partial International Search Report—PCT/US2021/049858—ISA/EPO—dated Jan. 7, 2022.

* cited by examiner

TECHNIQUES FOR PROVIDING DEDICATED DEMODULATION REFERENCE SIGNALS FOR TRANSMISSION REPETITIONS

CLAIM OF PRIORITY UNDER 35 U.S.C. § 119

The present application for patent claims priority to Provisional Patent Application No. 63/077,399, entitled "TECHNIQUES FOR PROVIDING DEDICATED DEMODULATION REFERENCE SIGNALS FOR TRANSMISSION REPETITIONS" filed Sep. 11, 2020, which is assigned to the assignee hereof and hereby expressly incorporated by reference herein for all purposes.

BACKGROUND

Aspects of the present disclosure relate generally to wireless communication systems, and more particularly, to transmitting channel transmission repetitions and associated demodulation reference signals.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In NR, a user equipment (UE) can be configured to transmit repetitions of channel transmissions to improve likelihood of a base station or another UE receiving the channel transmissions. 5G NR defines physical uplink shared channel (PUSCH) repetition Type A where the number of repetitions K>1 can be configured to apply the same start and length indicator value (SLIV) across K consecutive slots, such that the repetition begins at a same symbol offset and for a same symbol length in a given slot. 5G NR also defines a PUSCH repetition Type B where repetitions can be within and/or across slots, crossing slot boundaries, having dynamically indicated number of repetitions, having inter-nominal PUSCH frequency hopping, having a new uplink/downlink symbol interaction, having a new SLIV, etc. PUSCH repetition Type B can be defined by K nominal repetitions, each with a nominal length L, where the repetitions can be sent back-to-back (e.g., in consecutive symbols) starting from symbol S, where S and L are given by SLIV.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to receive a configuration indicating a number of symbols for transmitting a number of uplink channel transmission repetitions in one or more slots, and where, based on the configuration and a slot configuration of the one or more slots, a symbol length for one of the number of uplink channel transmission repetitions in a first slot is less than four symbols, at least one of defer transmitting at least a portion of the one of the number of uplink channel transmission repetitions, or transmit at least a portion of the one of the number of uplink channel transmission repetitions in a super uplink slot.

In another aspect, an apparatus for wireless communication is provided that includes a transceiver, a memory configured to store instructions, and one or more processors communicatively coupled with the memory and the transceiver. The one or more processors are configured to generate, based on a symbol length for an uplink channel transmission repetition that is less than four symbols within a given slot, a demodulation reference signal (DMRS) pattern for transmitting DMRS with the uplink channel transmission repetition, and transmit the uplink channel transmission repetition based on the DMRS pattern.

In another aspect, a method for wireless communications is provided that includes receiving a configuration indicating a number of symbols for transmitting a number of uplink channel transmission repetitions in one or more slots, and where, based on the configuration and a slot configuration of the one or more slots, a symbol length for one of the number of uplink channel transmission repetitions in a first slot is less than four symbols, at least one of deferring transmitting at least a portion of the one of the number of uplink channel transmission repetitions, or transmitting at least a portion of the one of the number of uplink channel transmission repetitions in a super uplink slot.

In another aspect, a method for wireless communication is provided that includes generating, based on a symbol length for an uplink channel transmission repetition that is less than four symbols within a given slot, a DMRS pattern for transmitting DMRS with the uplink channel transmission repetition, and transmitting the uplink channel transmission repetition based on the DMRS pattern.

According to an aspect, a method of wireless communication is provided. The method includes determining a symbol length for an uplink channel transmission repetition is less than four symbols, determining, based on the symbol length, a DMRS pattern for transmitting DMRS with the uplink channel transmission repetition, and transmitting the uplink channel transmission repetition based on the DMRS pattern.

According to another aspect, a method of wireless communication is provided. The method includes receiving a configuration indicating a number of symbols for transmitting a number of uplink channel transmission repetitions in one or more slots, determining, based on the configuration and a slot configuration of the one or more slots, that a symbol length for an uplink channel transmission repetition is less than four symbol, and refraining, based on determining the symbol length is less than four symbols, from transmitting the uplink channel transmission repetition.

According to another aspect, a method of wireless communication is provided that includes receiving a configuration indicating a number of symbols for transmitting a number of uplink channel transmission repetitions in one or more slots, determining, based on the configuration and a slot configuration of the one or more slots, that a symbol length for an uplink channel transmission repetition in a first slot is less than four symbol, and based on determining the symbol length is less than four symbols, at least one of deferring transmitting at least a portion of the uplink channel transmission repetition, or transmitting at least a portion of the uplink channel transmission repetition a super uplink slot.

According to another aspect, a method of wireless communication is provided that includes transmitting a first configuration indicating a number of symbols for a number of uplink channel transmission repetitions in one or more slots, transmitting a second configuration indicating one or more parameters for determining symbols for transmitting an uplink channel transmission repetition where a symbol length for the uplink channel transmission repetition is determined to be less than four symbols, and receiving, based on the first configuration and the second configuration, the uplink channel transmission repetition In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
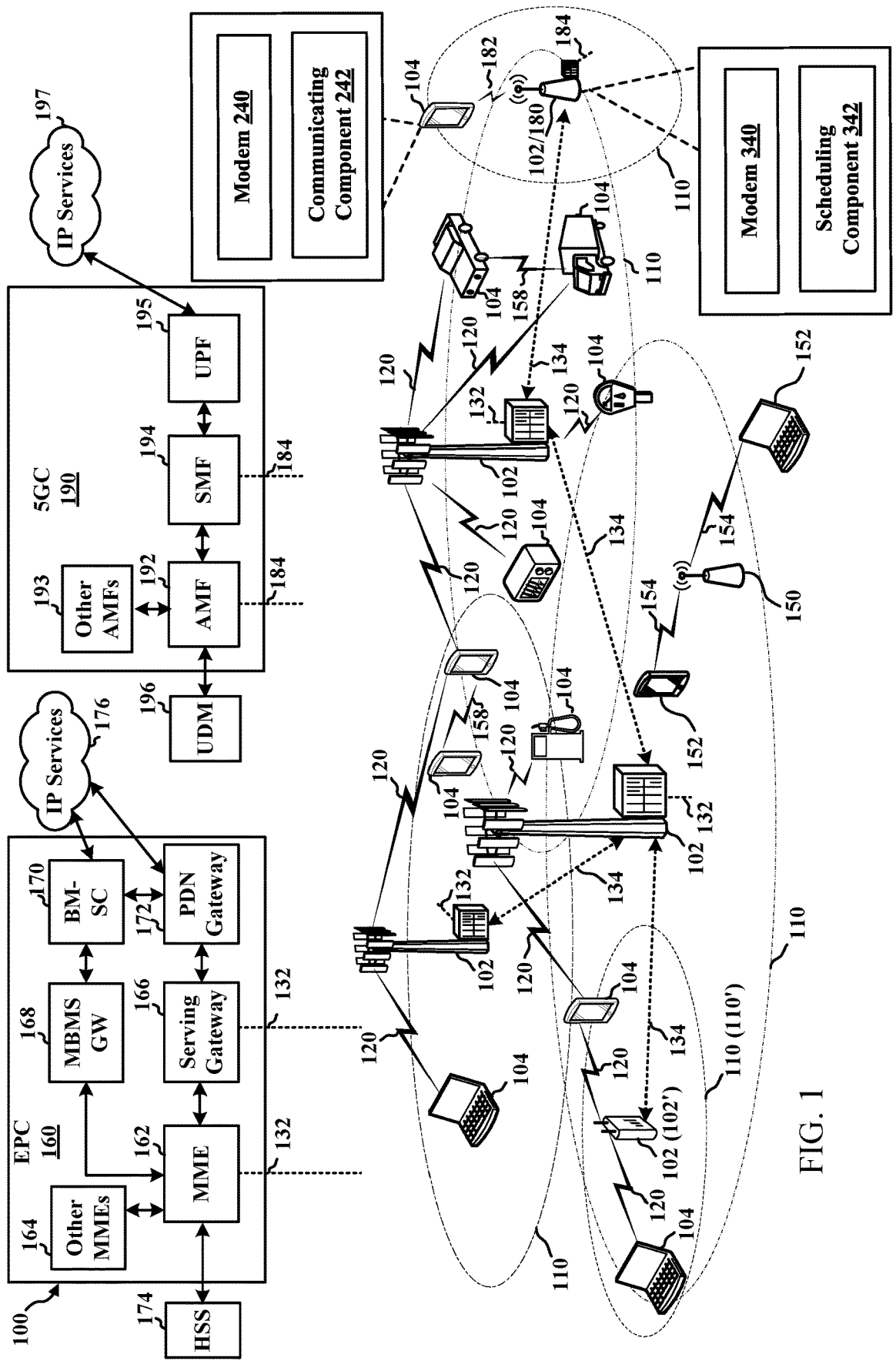
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing demodulation reference signals (DMRS) for channel transmission repetitions. In fifth generation (5G) new radio (NR), channel transmission repetitions can be defined where a device can transmit a channel and then can transmit one or more repetitions of the channel. The device can transmit the repetitions based on defined parameters indicating a starting symbol (e.g., orthogonal frequency division multiplexing (OFDM) symbol) for transmission of a repetition and a length (in symbols) of the repetition. In 5G NR, a slot structure can define symbol direction for multiple symbols in a slot. In some examples, the slot structure may not allow for consecutive symbols to be used for the length of the repetition (e.g., where the consecutive symbols have one or more symbols that are defined for different communication directions), which may result in a transmission of at least a portion of the repetition that is less than a certain symbol length. In 5G NR, DMRS patterns may not be designed for transmissions that are less than the certain symbol length (e.g., less than four symbols). Aspects described herein relate to providing DMRS for channel transmission repetitions by defining DMRS patterns for transmissions that are less than the certain symbol length and/or by ensuring that channel transmission repetitions have a symbol length that is at least the certain symbol length to have a defined DMRS pattern (e.g., at least four symbols).

For example, DMRS patterns can be defined for channel transmission repetitions that are less than four symbols in symbol length, such to allow a DMRS to be transmitted with the channel transmission repetition. In another example, channel transmission repetitions that are over less than four symbols can be dropped or deferred to other sets of symbols that are at least four symbols in length. In yet another example, a set of symbols can be selected for transmitting the channel transmission repetition, which may include a super slot formed of sets of consecutive symbols that cross a slot boundary or may include sets of non-consecutive symbols that have symbols of a different direction between. In this example, the channel transmission repetition can be scheduled in the super slot or in the sets of non-consecutive symbols along with an associated DMRS, or pattern of DMRSs, that is based on the symbol length of the super slot or the sets of non-consecutive symbols. In any case, a DMRS can be transmitted with a channel transmission repetition to improve demodulation and decoding thereof, which can increase throughput and reliability of communications.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for providing DMRS for channel transmission repetitions, in accordance with aspects described herein. In addition, some nodes may have a modem 340 and scheduling component 342 for configuring a device to provide DMRS for channel transmission repetitions, in accordance with aspects described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can provide DMRS for channel transmission repetitions by defining a DMRS pattern for repetitions that are mapped to a set of uplink symbols that are below a threshold symbol length, by dropping repetitions that are mapped to a set of uplink symbols that are below a threshold symbol length, by deferring repetitions to a set of uplink symbols that are at least of a threshold symbol length, by transmitting the channel transmission repetitions in a super uplink slot, etc. In an example, scheduling component 342 can schedule the channel transmission repetitions for the UE 104 and/or can configure the UE 104 to provide the DMRS for channel transmission repetitions in some examples described herein.

Turning now to FIGS. 2-9, aspects are depicted with reference to one or more components and one or more methods that may perform the actions or operations described herein, where aspects in dashed line may be optional. Although the operations described below in FIGS. 4-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
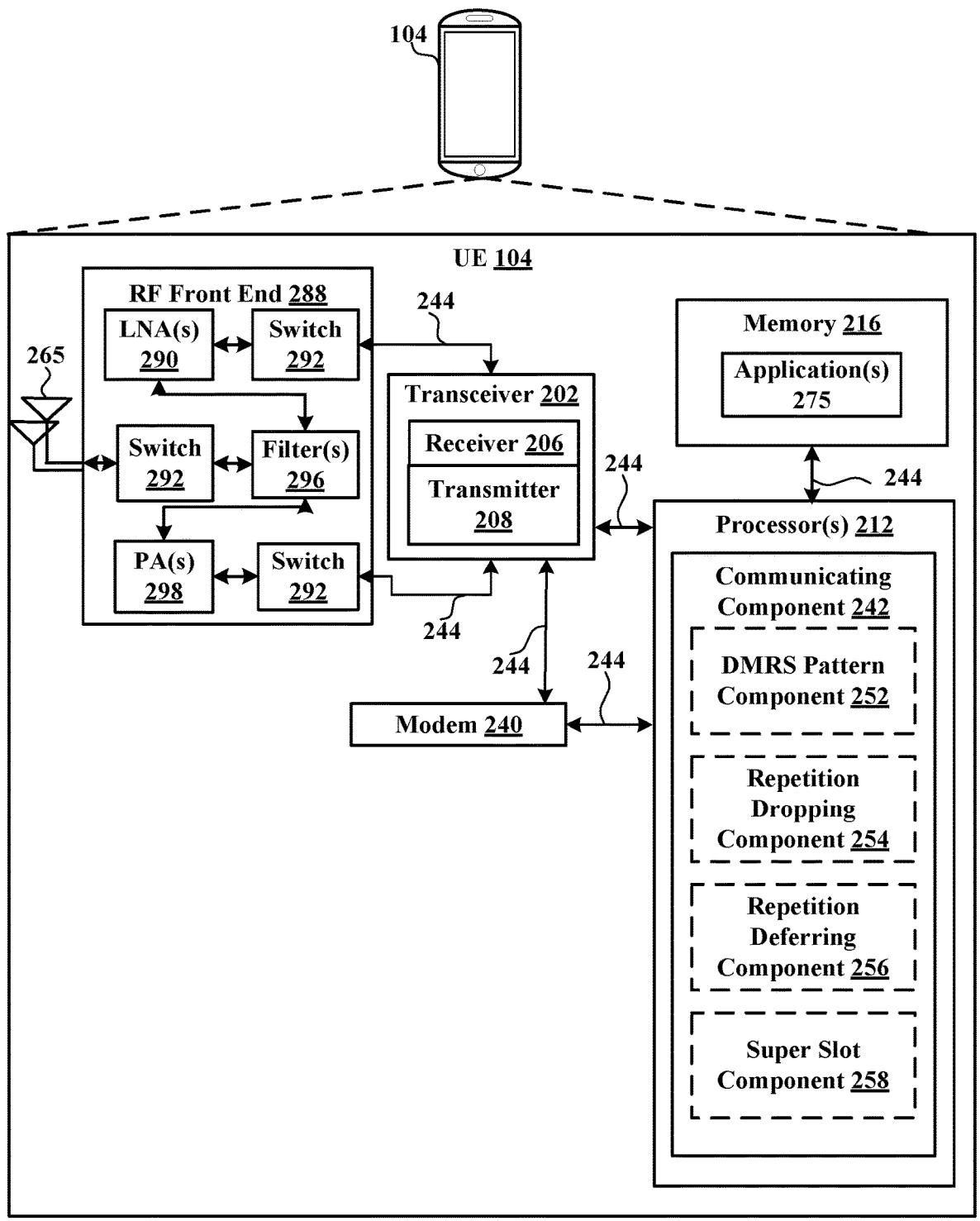
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for providing DMRS for channel transmission repetitions, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a DMRS pattern component 252 for defining a DMRS pattern for channel transmission repetitions that are mapped to a set of uplink symbols that are less than a threshold symbol length, a repetition dropping component 254 for dropping channel transmission repetitions that are mapped to a set of uplink symbols that are less than a threshold symbol length, a repetition deferring component 256 for deferring channel transmission repetitions to sets of uplink symbols that are at least of a threshold symbol length, and/or a super slot component 258 for creating a super slot during which to transmit the channel transmission repetition, in accordance with aspects described herein.

In an aspect, the processor(s) 212 may correspond to one or more of the processors described in connection with the UE in FIG. 9. Similarly, the memory 216 may correspond to the memory described in connection with the UE in FIG. 9.

Figure 3:
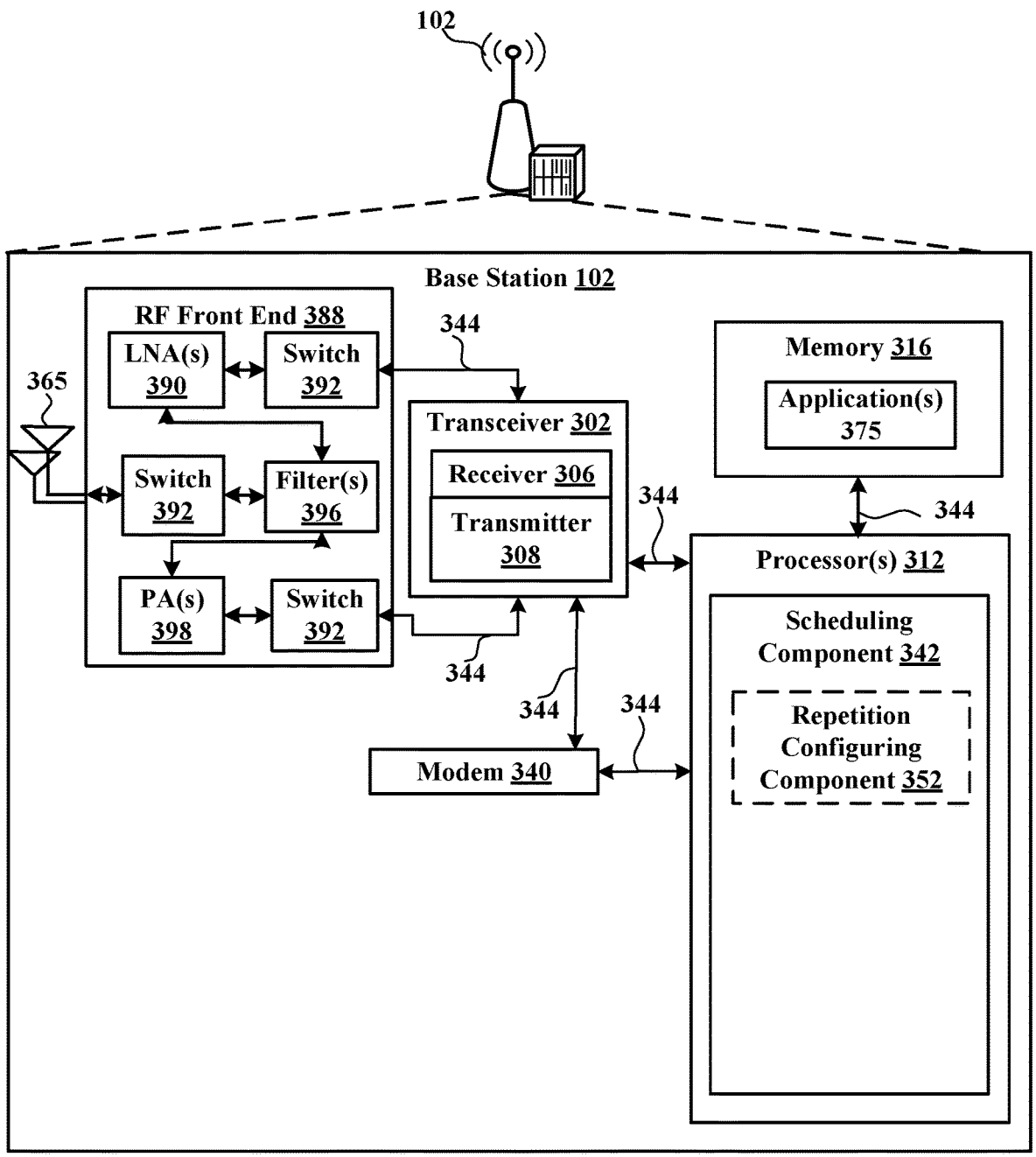
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for configuring a device to provide DMRS for channel transmission repetitions, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a repetition configuring component 352 for configuring a UE 104 to transmit uplink channel repetitions, in accordance with aspects described herein.

In an aspect, the processor(s) 312 may correspond to one or more of the processors described in connection with the base station in FIG. 9. Similarly, the memory 316 may correspond to the memory described in connection with the base station in FIG. 9.

As described above, 5G NR defines physical uplink shared channel (PUSCH) repetition type A and B, where type A can include a number of repetitions K>1 where the same start and length indicator value (SLIV) is applied across K consecutive slots, and where type B can include K nominal repetitions, each with nominal length L sent back-to-back starting from symbol S, where S and L are given by SLIV. The base station 102 can configure SLIV for a UE 104, such that the UE 104 can determine when to transmit PUSCH repetitions based on the SLIV and/or based on a configured slot format.

For example, communications can be generally configured in a slot of multiple OFDM symbols, and a slot format for the slot can be defined and configured to indicate a communication direction for each symbol in the slot (e.g., as being uplink or downlink). Thus, where a repetition is mapped over a set of symbols that include one or more non-uplink symbols, the actual repetition length may be shortened. Both repetition types can be applied for dynamic grant, where a UE receives an uplink grant from the base station in downlink control information (DCI), and/or configured grant, where a UE receives at least a semi-static indication of possible uplink resources that may be scheduled (e.g., in RRC signaling) and an activation DCI from the base station indicating which of the possible uplink resources are scheduled for the UE.

For PUSCH repetition type B, nominal repetitions can be repetitions in virtual domain, ignoring slot boundary and downlink (DL) interruption, and actual repetitions can be such that a nominal repetition can be broken into multiple actual repetitions, due to slot boundary and/or DL interruption. In addition, for PUSCH repetition type B, segmentation can be used where a nominal PUSCH repetition can be segmented around a slot border, around semi-static DL symbols, and/or possibly around an InvalidSymbolPattern parameter.

The similar idea of PUSCH type B repetition can be applied to physical uplink control channel (PUCCH) repetition, to allow multiple PUCCH repetition within a slot, unequal length cross repetitions, slot boundary breaking a nominal repetition into multiple (e.g., 2) actual repetitions, DL OFDM symbols break a nominal repetition into multiple actual repetitions, etc. For example, the slot boundary breaking can be due to UE not being able to keep phase coherent PUCCH/PUSCH repetitions across slot boundary. In addition, for example, DL OFDM symbols breaking can be due to UE not being able to keep phase coherent with DL in between of PUCCH/PUSCH repetitions. DMRS pattern design in 5G NR can include, given a set of contiguous OFDM symbols (OS) for PUCCH/PUSCH, selecting a subset of OFDM symbols dedicated for DMRS. The definition of channel transmission repetitions may not coincide with DMRS pattern design at least due to unequal symbol length across repetitions. Some aspects described herein relate to designing a DMRS pattern for each different PUCCH/PUSCH duration (number of OS).

Figure 4:
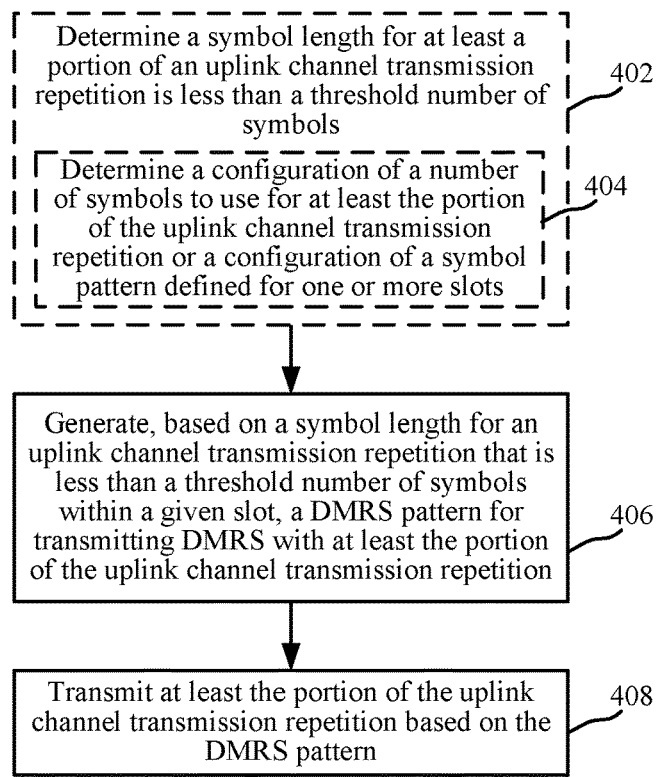
FIG. 4 is a flow chart illustrating an example of a method for defining demodulation reference signal (DMRS) patterns for channel transmission repetitions, in accordance with various aspects of the present disclosure.

FIG. 4 illustrates a flow chart of an example of a method 400 for defining a DMRS pattern for uplink channel transmission repetitions that are less than a threshold number of symbols, in accordance with aspects described herein. In an example, a UE 104 can perform the functions described in method 400 using one or more of the components described in FIGS. 1 and 2.

In method 400, optionally at Block 402, it can be determined that a symbol length for at least a portion of an uplink channel transmission repetitions is less than a threshold number of symbols. In an aspect, DMRS pattern component 252, e.g., in conjunction with processor(s) 212, memory 216, transceiver 202, communicating component 242, etc., can determine the symbol length for at least the portion of the uplink channel transmission repetitions is less than the threshold number of symbols. For example, DMRS pattern component 252 can determine the symbol length based on determining a set of uplink symbols to which at least the portion of the uplink channel transmission repetition is mapped.

In one example, in determining the symbol length at Block 402 may optionally include, at Block 404, determining a configuration of a number of symbols to use for at least the portion of the uplink channel transmission repetition or a configuration of a symbol pattern defined for one or more slots. In an aspect, DMRS pattern component 252, e.g., in conjunction with processor(s) 212, memory 216, transceiver 202, communicating component 242, etc., can determine the configuration of the number of symbols to use for at least the portion of the uplink channel transmission repetition or the configuration of the symbol pattern defined for one or more slots. In an example, DMRS pattern component 252 can determine the set of uplink symbols based on a configuration of a slot format of one or more slots and a configuration for the uplink channel transmission repetition (e.g., the SLIV parameters). For example, communicating component 242 can receive one or more of the configurations from the base station 102 (e.g., in radio resource control (RRC) signaling, system information or other broadcast signaling, downlink control information (DCI), etc.). In addition, in an example, the threshold number of symbols can correspond to a lowest number of symbols for which DMRS can be provided in a radio access technology (RAT). In 5G NR, for example, the threshold number of symbols can be four. In an example, PUCCH can use discrete Fourier transform-spread-OFDM (DFT-S-OFDM) waveform to preserve low peak-to-average power ratio (PAPR) for coverage. For PUCCH with DFT-S-OFDM waveform, 5G NR may not define DMRS pattern for PUCCH with less than four OFDM symbols. In this example, DMRS pattern component 252 can determine the set of uplink symbols to be less than four.

For instance, DMRS pattern component 252 can determine the symbols for at least the portion of the uplink channel transmission repetition to be either the first uplink symbols immediately following the initial uplink channel transmission or as defined by starting symbol (e.g., Sin the SLIV). In addition, for example, DMRS pattern component 252 can determine the symbol length to be the lesser of the nominal length (e.g., L in the SLIV) and the length of a set of uplink symbols starting at the starting symbol and before encountering a non-uplink (e.g., downlink) symbol in the slot or a slot boundary (e.g., last symbol of the slot). An example is shown in FIG. 8.

Figure 8:
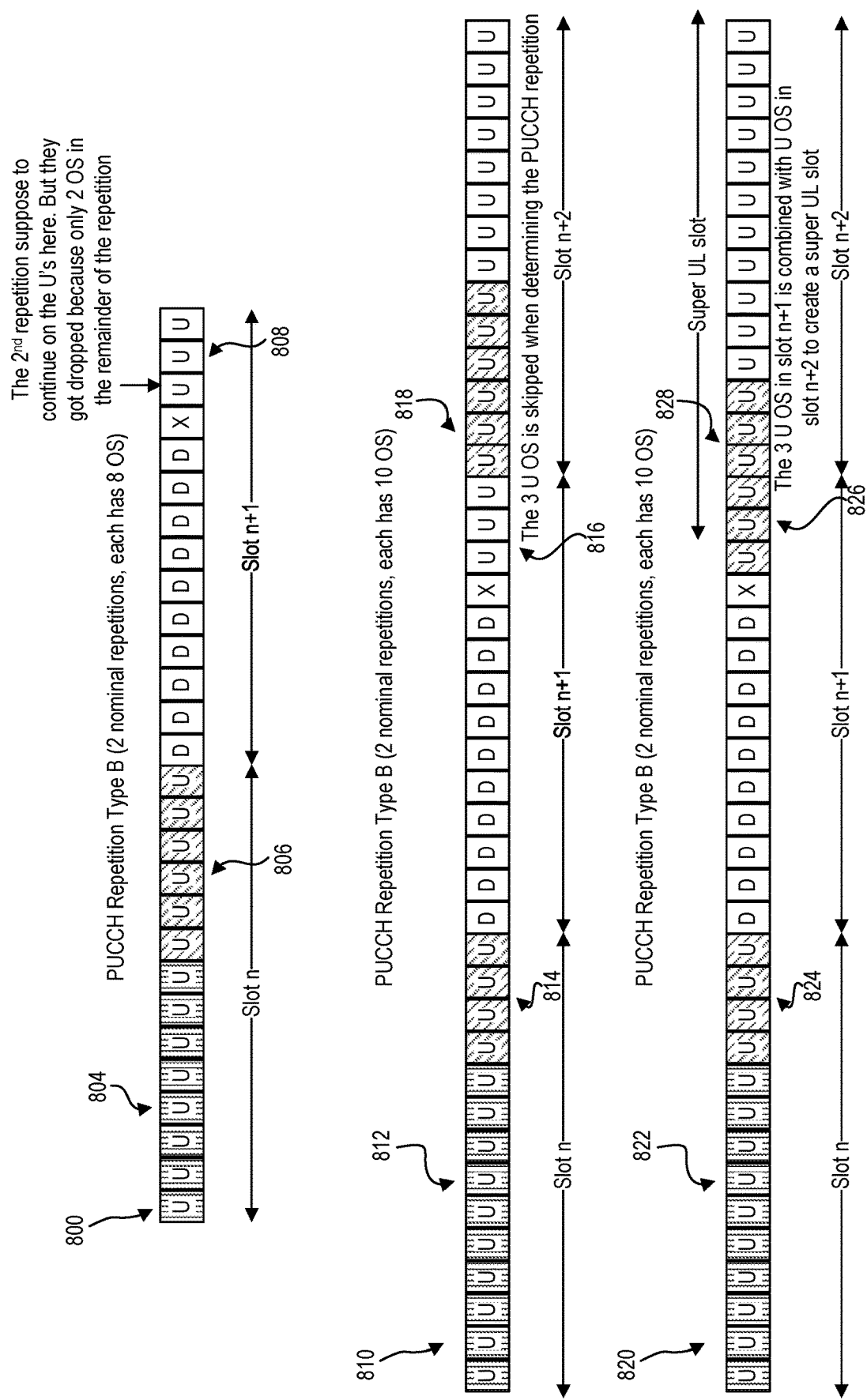
FIG. 8 illustrates examples of timelines for transmitting initial channel transmissions and channel transmission repetitions in accordance with various aspects of the present disclosure.

FIG. 8 illustrates examples of timelines 800, 810, 820 for transmitting initial channel transmissions and channel transmission repetitions in accordance with aspects described herein. Timeline 800 shows an initial transmission 804, and a first portion of a repetition 806 starting in the uplink symbols immediately following the initial transmission 804 and having a symbol length of 6 before a downlink symbol in the slot. A second portion of the repetition may be mapped to a set of uplink symbols starting at symbol 808, but may in some examples be dropped as having a symbol length of 3, which may be less than a threshold symbol length. In the example described in FIG. 4, however, the second portion of the repetition may be mapped to the set of uplink symbols starting at symbol 808, and a DMRS pattern may be defined though the symbol length of 3 may be less than a threshold symbol length for DMRS in 5G NR.

In method 400, at Block 406, a DMRS pattern for transmitting DMRS with at least the portion of the uplink channel transmission repetition can be generated based on a symbol length for an uplink channel transmission repetition that is less than a threshold number of symbols within a given slot. In an aspect, DMRS pattern component 252, e.g., in conjunction with processor(s) 212, memory 216, transceiver 202, communicating component 242, etc., can generate, based on the symbol length for the uplink channel transmission repetition that is less than the threshold number of symbols within the given slot, the DMRS pattern for transmitting DMRS with at least the portion of the uplink channel transmission repetition. For example, DMRS patterns can be defined for repetitions that are less than the threshold symbol length. For example, for three symbols, a DMRS pattern can include transmitting a DMRS in a middle symbol (e.g., uplink symbol, DMRS symbol, uplink symbol), and DMRS pattern component 252 can accordingly generate such a DMRS pattern for a three symbol length repetition. For example, for two symbols, a DMRS pattern can include transmitting a DMRS in one of the symbols (e.g., uplink symbol, DMRS symbol or DMRS symbol, uplink symbol), and DMRS pattern component 252 can accordingly generate such a DMRS pattern for a two symbol length repetition.

In method 400, at Block 408, at least the portion of the uplink channel transmission repetition can be transmitted based on the DMRS. In an aspect, communicating component 242, e.g., in conjunction with processor(s) 212, memory 216, transceiver 202, etc., can transmit at least the portion of the uplink channel transmission repetition based on the DMRS pattern. For example, communicating component 242 can transmit at least the portion of the uplink channel repetition that is less than the threshold number of symbols by introducing a DMRS into one or more of the symbols based on the DMRS pattern defined for the number of symbols, as described.

Figure 5:
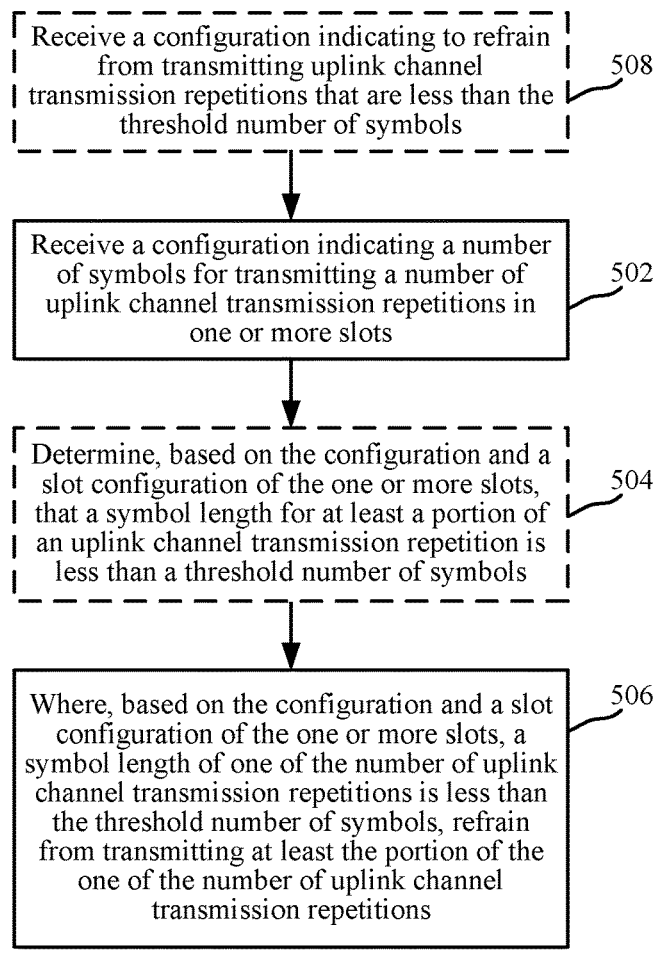
FIG. 5 is a flow chart illustrating an example of a method for dropping channel transmission repetitions, in accordance with various aspects of the present disclosure.

FIG. 5 illustrates a flow chart of an example of a method 500 for dropping uplink channel transmission repetitions that are less than a threshold number of symbols, in accordance with aspects described herein. In an example, a UE 104 can perform the functions described in method 500 using one or more of the components described in FIGS. 1 and 2.

In method 500, at Block 502, a configuration indicating a number of symbols for transmitting a number of uplink channel transmission repetitions in one or more slots can be received. In an aspect, communicating component 242, e.g., in conjunction with processor(s) 212, memory 216, transceiver 202, etc., can receive the configuration indicating the number of symbols for transmitting the number of uplink channel transmission repetitions in one or more slots. For example, communicating component 242 can receive the configuration from the base station 102 (e.g., in RRC signaling, system information, DCI, etc.), as described above. In an example, the configuration can be received for a given uplink channel transmission to define repetitions for the uplink channel transmission. The configuration can include SLIVs, such as S, L, K, as described above, from which the UE 104 can determine symbols over which to transmit uplink channel transmission repetitions after the initial uplink channel transmission.

In method 500, optionally at Block 504, it can be determined, based on the configuration and a slot configuration of the one or more slots, that a symbol length for at least a portion of an uplink channel transmission repetition is less than a threshold number of symbols. In an aspect, repetition dropping component 254, e.g., in conjunction with processor(s) 212, memory 216, transceiver 202, communicating component 242, etc., can determine, based on the configuration and the slot configuration of the one or more slots, that the symbol length for at least the portion of the uplink channel transmission repetition is less than the threshold number of symbols. In an example, as described, communicating component 242 can also receive the slot configuration from the base station 102 (e.g., in RRC signaling, system information, DCI, etc.), which can indicate a communication direction of each of multiple symbols in the slot (e.g., as uplink, downlink etc. symbols). Communicating component 242, in this regard, can determine the set of uplink symbols for transmitting at least the portion of the uplink channel transmission repetition, as described, which may include determining a set of uplink symbols starting at or after symbol S (or immediately after the initial uplink channel transmission), and continuing for a symbol length that can be the lesser of L or until a non-uplink symbol or a slot boundary (e.g., last symbol of the slot) is encountered. Repetition dropping component 254 can determine whether this symbol length is less than a threshold for DMRS definition (e.g., four symbols in 5G NR). Referring again to the example in FIG. 8, repetition dropping component 254 can determine the symbol length for the set of uplink symbols starting with symbol 808 is less than the threshold symbol length (e.g., less than four symbols).

In method 500, at Block 506, where, based on the configuration and a slot configuration of the one or more slots, a symbol length of one of the number of uplink channel transmission repetitions is less than the threshold number of symbols, transmitting at least the portion of the one of the number of uplink channel transmission repetitions can be refrained from. In an aspect, repetition dropping component 254, e.g., in conjunction with processor(s) 212, memory 216, transceiver 202, communicating component 242, etc., can where, based on the configuration and a slot configuration of the one or more slots, a symbol length of one of the number of uplink channel transmission repetitions is less than the threshold number of symbols, refrain from transmitting at least the portion of the one of the number of uplink channel transmission repetitions. In an example, refraining from transmitting at least the portion of the uplink channel transmission repetition can include dropping the repetition and not transmitting the repetition over the determined set of uplink symbols.

In an example, optionally at Block 508, a configuration indicating to refrain from transmitting uplink transmission repetitions that are less than the threshold number of symbols can be received. In an aspect, repetition dropping component 254, e.g., in conjunction with processor(s) 212, memory 216, transceiver 202, communicating component 242, etc., can receive the configuration indicating to refrain from transmitting uplink channel transmission repetitions that are less than the threshold number of symbols (e.g., in symbol length). For example, repetition dropping component 254 can receive the configuration in RRC signaling, system information, DCI, etc., from the base station 102, and can refrain from transmitting the uplink channel transmission repetitions that are less than the threshold number of symbols based on the configuration.

In an example, in conjunction with method 400 described above, a UE 104 can define DMRS patterns for some portions of uplink channel transmission repetitions that are less than a first threshold in symbol length (e.g., less than four symbols) but greater than a second threshold in symbol length (e.g., greater than one or two symbols), but can drop portions of uplink channel transmission repetitions that are less than the second threshold in symbol length (e.g., less than one or two symbols).

Figure 6:
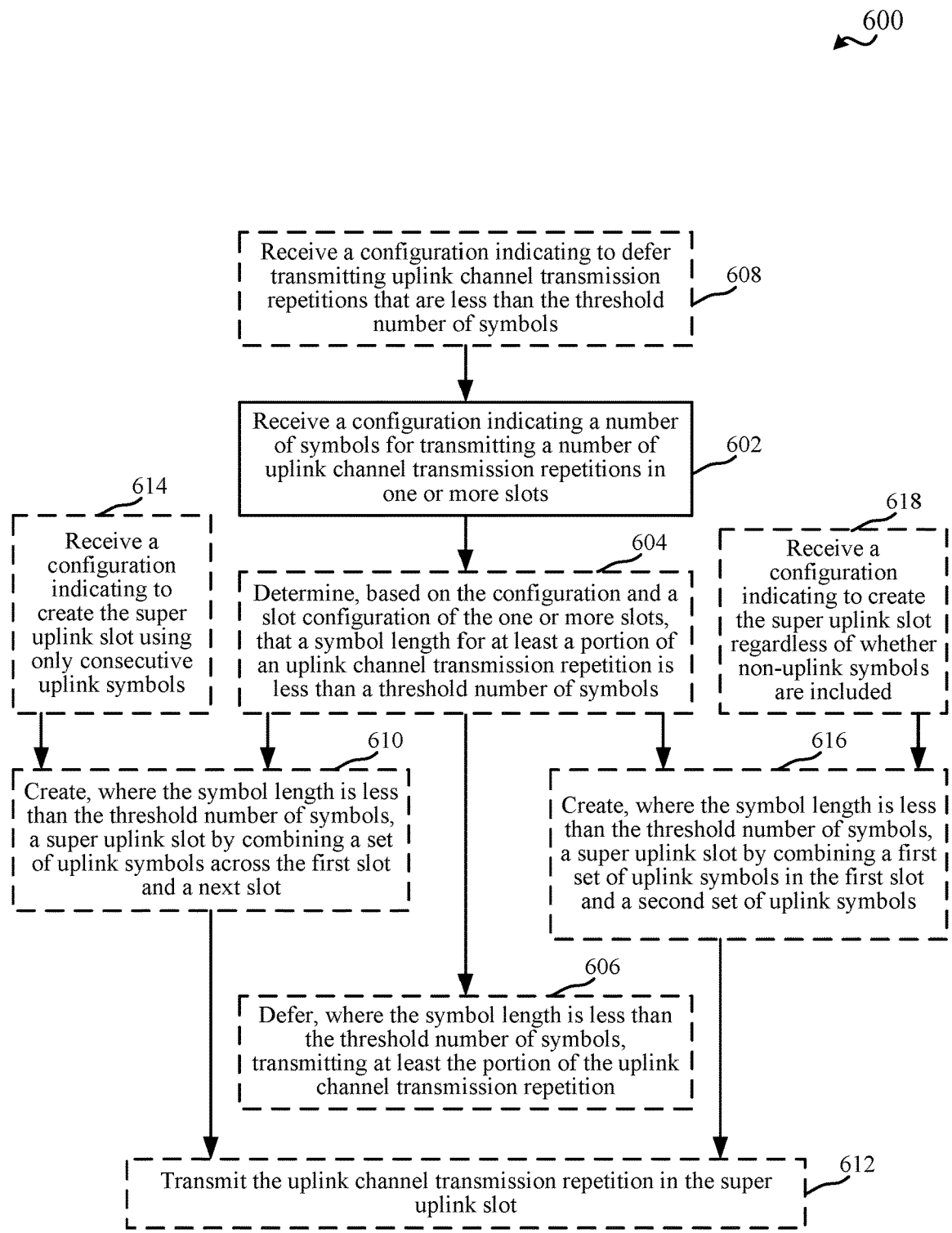
FIG. 6 is a flow chart illustrating an example of a method for deferring channel transmission repetitions or transmitting the channel transmission repetitions in a super slot, in accordance with various aspects of the present disclosure.

FIG. 6 illustrates a flow chart of an example of a method 600 for deferring, or transmitting in a super slot, uplink channel transmission repetitions that are less than a threshold number of symbols, in accordance with aspects described herein. In an example, a UE 104 can perform the functions described in method 600 using one or more of the components described in FIGS. 1 and 2.

In method 600, at Block 602, a configuration indicating a number of symbols for transmitting a number of uplink channel transmission repetitions in one or more slots can be received. In an aspect, communicating component 242, e.g., in conjunction with processor(s) 212, memory 216, transceiver 202, etc., can receive the configuration indicating the number of symbols for transmitting the number of uplink channel transmission repetitions in one or more slots. For example, communicating component 242 can receive the configuration from the base station 102 (e.g., in RRC signaling, system information, DCI, etc.), as described above. In an example, the configuration can be received for a given uplink channel transmission to define repetitions for the uplink channel transmission. The configuration can include SLIVs, such as S, L, K, as described above, from which the UE 104 can determine symbols over which to transmit uplink channel transmission repetitions after the initial uplink channel transmission.

In method 600, optionally at Block 604, it can be determined, based on the configuration and a slot configuration of the one or more slots, that a symbol length for at least a portion of an uplink channel transmission repetition is less than a threshold number of symbols. In an aspect, repetition deferring component 256, e.g., in conjunction with processor(s) 212, memory 216, transceiver 202, communicating component 242, etc., can determine, based on the configuration and the slot configuration of the one or more slots, that the symbol length for at least the portion of the uplink channel transmission repetition is less than the threshold number of symbols. In an example, as described, communicating component 242 can also receive the slot configuration from the base station 102 (e.g., in RRC signaling, system information, DCI, etc.), which can indicate a communication direction of each of multiple symbols in the slot (e.g., as uplink, downlink etc. symbols). Communicating component 242, in this regard, can determine the set of uplink symbols for transmitting at least the portion of the uplink channel transmission repetition, as described, which may include determining a set of uplink symbols starting at or after symbol S (or immediately after the initial uplink channel transmission), and continuing for a symbol length that can be the lesser of L or until a non-uplink symbol or slot boundary (e.g., last symbol of the slot) is encountered. Repetition deferring component 256 can determine whether this symbol length is less than a threshold for DMRS definition (e.g., four symbols in 5G NR).

Referring to FIG. 8, timeline 810 shows an initial transmission 812, and a first portion of a repetition 814 starting in the uplink symbols immediately following the initial transmission 812 and having a symbol length of 4 before a downlink symbol in the slot. A second portion of the repetition may be initially determined for mapping to a set of uplink symbols starting at symbol 816, but may in some examples be deferred as the set of uplink symbols at symbol 816 have a symbol length of 3 before the slot boundary, which may be less than a threshold symbol length. Accordingly, repetition deferring component 256 can determine the symbol length for the set of uplink symbols starting with symbol 816 is less than the threshold symbol length (e.g., less than four symbols). In an example, repetition deferring component 256 can accordingly determine to defer the second portion of the repetition to a set of uplink symbols that are of at least the threshold symbol length (which may include determining a next set of uplink symbols starting at symbol 818 and including a subsequent set of one or more uplink symbols).

In method 600, optionally at Block 606, transmitting at least the portion of the uplink channel transmission repetition can be deferred where the symbol length is less than the threshold number of symbols. In an aspect, repetition deferring component 256, e.g., in conjunction with processor(s) 212, memory 216, transceiver 202, communicating component 242, etc., can defer, where the symbol length is less than the threshold number of symbols, transmitting at least the portion of the uplink channel transmission repetition. For example, repetition deferring component 256 can defer at least the portion of the uplink channel transmission repetition to a next set of uplink symbols (e.g., in a current or next slot, where the next set of uplink symbols are at least of the threshold symbol length). Referring to FIG. 8, where the uplink symbols starting at symbol 816 are of a symbol length less than the threshold, repetition deferring component 256 can determine to defer the second portion of the repetition until uplink symbols 818 in the next slot to ensure at least the threshold number of symbols are used for the repetition to allow for DMRS to be transmitted with the second portion of the repetition.

In an example, optionally at Block 608, a configuration indicating to defer transmitting uplink transmission repetitions that are less than the threshold number of symbols can be received. In an aspect, repetition deferring component 256, e.g., in conjunction with processor(s) 212, memory 216, transceiver 202, communicating component 242, etc., can receive the configuration indicating to defer transmitting uplink channel transmission repetitions that are less than the threshold number of symbols (e.g., in symbol length). For example, repetition deferring component 256 can receive the configuration in RRC signaling, system information, DCI, etc., from the base station 102, and can defer transmitting the uplink channel transmission repetitions that are less than the threshold number of symbols based on the configuration.

In another example, repetition deferring component 256 can transmit at least the portion of the uplink channel transmission repetition to a formed super uplink slot that includes either consecutive uplink symbols that span multiple slots or multiple sets of uplink symbols, which may or may not span multiple slots, having one or more non-uplink symbols in between, as described further herein.

In method 600, optionally at Block 610, a super uplink slot can be created, where the symbol length is less than the threshold number of symbols, by combining a set of uplink symbols across the first slot and a next slot. In an aspect, super slot component 258, e.g., in conjunction with processor(s) 212, memory 216, transceiver 202, communicating component 242, etc., can create, where the symbol length is less than the threshold number of symbols, the super uplink slot by combining the set of uplink symbols across the first slot and the next slot. For example, super slot component 258 can determine that the symbol length is less than the threshold (e.g., four symbols) due to the existence of the symbol boundary in the symbols to which the uplink channel transmission repetition is being mapped, as described above. In this example, where super slot component 258 determines that the next slot starts with uplink symbols, super slot component 258 can create the super uplink slot including the original symbols to which the uplink channel transmission repetition is being mapped and one or more additional symbols of the next slot. For example, super slot component 258 can combine the original set of uplink symbols across the first slot with the additional symbols in the next slot based on determining a consecutive set of symbols across the first slot and the next slot include only uplink symbols. For example, super slot component 258 can determine the number of symbols of the next slot to use to achieve nominal length L or until a non-uplink symbol is encountered (e.g., whichever is less). In this example, super slot component 258 can transmit the uplink channel transmission repetition in the super uplink slot, where the super uplink slot is at least the threshold symbol length.

In this example, optionally at Block 612, the uplink channel transmission repetition can be transmitted in the super uplink slot. In an aspect, super slot component 258, e.g., in conjunction with processor(s) 212, memory 216, transceiver 202, communicating component 242, etc., can transmit the uplink channel transmission repetition in the super uplink slot. For example, as described, super slot component 258 can transmit the uplink channel transmission repetition in the super uplink slot that spans multiple slots. An example is shown in FIG. 8.

Referring to FIG. 8, timeline 820 shows an initial transmission 822, and a first portion of a repetition 824 starting in the uplink symbols immediately following the initial transmission 822 and having a symbol length of 4 before a downlink symbol in the slot. A second portion of the repetition may be initially determined for mapping to a set of uplink symbols starting at symbol 826, but may in some examples be considered for instead creating a super uplink slot as the set of uplink symbols at symbol 826 have a symbol length of 3 before the slot boundary, which may be less than a threshold symbol length. Accordingly, super slot component 258 can determine the symbol length for the set of uplink symbols starting with symbol 826 is less than the threshold symbol length (e.g., less than four symbols), and can determine that the next slot starts with an uplink symbol. In an example, super slot component 258 can accordingly create a super uplink slot including the uplink symbols beginning at symbol 826 and spanning to the slot boundary, along with one or more uplink symbols of the next slot, such as the symbols starting with symbol 828 and spanning enough symbols to satisfy the nominal length (L=10, in this example), (e.g., along with the first portion of the uplink channel transmission repetition. Super slot component 258 can transmit the second portion of the uplink channel transmission repetition over this super uplink slot.

In an example, optionally at Block 614, a configuration indicating create the super uplink slot using only consecutive uplink symbols can be received. In an aspect, super slot component 258, e.g., in conjunction with processor(s) 212, memory 216, transceiver 202, communicating component 242, etc., can receive the configuration indicating to create the super uplink slot using only consecutive uplink symbols. For example, super slot component 258 can receive the configuration in RRC signaling, system information, DCI, etc., from the base station 102, and can create the super uplink slot, at Block 610, based on the configuration.

In method 600, optionally at Block 616, a super uplink slot can be created, where the symbol length is less than the threshold number of symbols, by combining a first set of uplink symbols in the first slot and a second set of uplink symbols. In an aspect, super slot component 258, e.g., in conjunction with processor(s) 212, memory 216, transceiver 202, communicating component 242, etc., can create, where the symbol length is less than the threshold number of symbols, the super uplink slot by combining the first set of uplink symbols in the first slot and the second set of uplink symbols. In an example, the first and second sets of uplink symbols may be in the same or different slots, and may include one or more non-uplink symbols between them. For example, super slot component 258 can determine that the symbol length is less than the threshold (e.g., four symbols) due to the existence of the symbol boundary or of a non-uplink symbol (e.g., a downlink symbol) in the symbols to which the uplink channel transmission repetition is being mapped, as described above. In this example, super slot component 258 can determine a next set of uplink symbols that can result in a symbol length that achieves the threshold, and can create a super uplink slot including the original symbols to which the uplink channel transmission repetition is being mapped and one or more additional symbols in the next set of uplink symbols. For example, super slot component 258 can determine the number of symbols of the next set of uplink symbols to use to achieve nominal length L or until another non-uplink symbol is encountered (e.g., whichever is less). In this example, super slot component 258 can transmit the uplink channel transmission repetition in the super uplink slot, where the super uplink slot is at least the threshold symbol length.

In this example, optionally at Block 612, the uplink channel transmission repetition can be transmitted in the super uplink slot. In an aspect, super slot component 258, e.g., in conjunction with processor(s) 212, memory 216, transceiver 202, communicating component 242, etc., can transmit the uplink channel transmission repetition in the super uplink slot. For example, as described, super slot component 258 can transmit the uplink channel transmission repetition in the super uplink slot that includes multiple sets of uplink symbols that can be separated by one or more non-uplink symbols.

In an example, optionally at Block 618, a configuration indicating create the super uplink slot regardless of whether non-uplink symbols are included can be received. In an aspect, super slot component 258, e.g., in conjunction with processor(s) 212, memory 216, transceiver 202, communicating component 242, etc., can receive the configuration indicating to create the super uplink slot regardless of whether non-uplink symbols are included. For example, super slot component 258 can receive the configuration in RRC signaling, system information, DCI, etc., from the base station 102, and can create the super uplink slot, at Block 610, based on the configuration.

Figure 7:
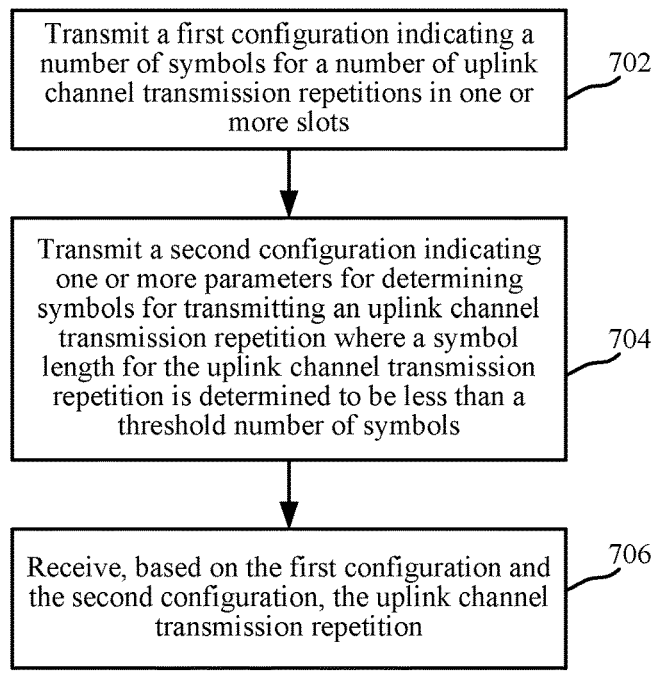
FIG. 7 is a flow chart illustrating an example of a method for configuring devices for performing channel transmission repetitions, in accordance with various aspects of the present disclosure.

FIG. 7 illustrates a flow chart of an example of a method 700 for configuring a UE to drop or defer, or create super uplink slots for, uplink channel transmission repetitions that are less than a threshold number of symbols, in accordance with aspects described herein. In an example, a base station 102 can perform the functions described in method 700 using one or more of the components described in FIGS. 1 and 3.

In method 700, at Block 702, a first configuration indicating a number of symbols for a number of uplink channel transmission repetitions in one or more slots can be transmitted. In an aspect, repetition configuring component 352, e.g., in conjunction with processor(s) 312, memory 316, transceiver 302, scheduling component 342, etc., can transmit the configuration indicating the number of symbols for the number of uplink channel transmission repetitions in one or more slots. For example, repetition configuring component 352 can transmit the configuration to a UE 104 (e.g., in RRC signaling, system information, DCI, etc.), as described above. In an example, the configuration can be received for a given uplink channel transmission to define repetitions for the uplink channel transmission. The configuration can include SLIVs, such as S, L, K, as described above, from which the UE 104 can determine symbols over which to transmit uplink channel transmission repetitions after the initial uplink channel transmission.

In method 700, at Block 704, a second configuration indicating one or more parameters for determining symbols for transmitting an uplink channel repetitions where a symbol length for the uplink channel transmission repetition is determined to be less than a threshold number of symbols can be transmitted. In an aspect, repetition configuring component 352, e.g., in conjunction with processor(s) 312, memory 316, transceiver 302, scheduling component 342, etc., can transmit a second configuration indicating one or more parameters for determining symbols for transmitting an uplink channel repetitions where a symbol length for the uplink channel transmission repetition is determined to be less than a threshold number of symbols. For example, repetition configuring component 352 can transmit the second configuration in RRC signaling, system information, DCI, etc. In one example, repetition configuring component 352 can transmit the second configuration for each uplink channel transmission, defining associated repetitions. Moreover, in an example, the second configuration can indicate at least one of to drop repetitions that are less than the threshold number of symbols, to defer repetitions that are less than the threshold number of symbols, to create an uplink super slot for transmitting deferred repetitions (e.g., to create an uplink super slot using only consecutive uplink symbols or regardless of whether one or more non-uplink symbols exist between the sets of uplink symbols), and/or the like.

In method 700, at Block 706, the uplink channel transmission repetition can be received based on the first configuration and the second configuration. In an aspect, scheduling component 342, e.g., in conjunction with processor(s) 312, memory 316, transceiver 302, etc., can receive, based on the first configuration and the second configuration, the uplink channel transmission repetition. As described, for example, scheduling component 342 can determine the symbols over which the repetition is received based on the configuration of symbols for transmitting the repetition, the actual slot format, the configuration indicating how to drop or transmit repetitions where the symbol length is less than the threshold, etc. Thus, for example, scheduling component 342 can similarly determine how the UE 104 transmits uplink channel repetitions based on the configurations it provides to the UE 104.

Figure 9:
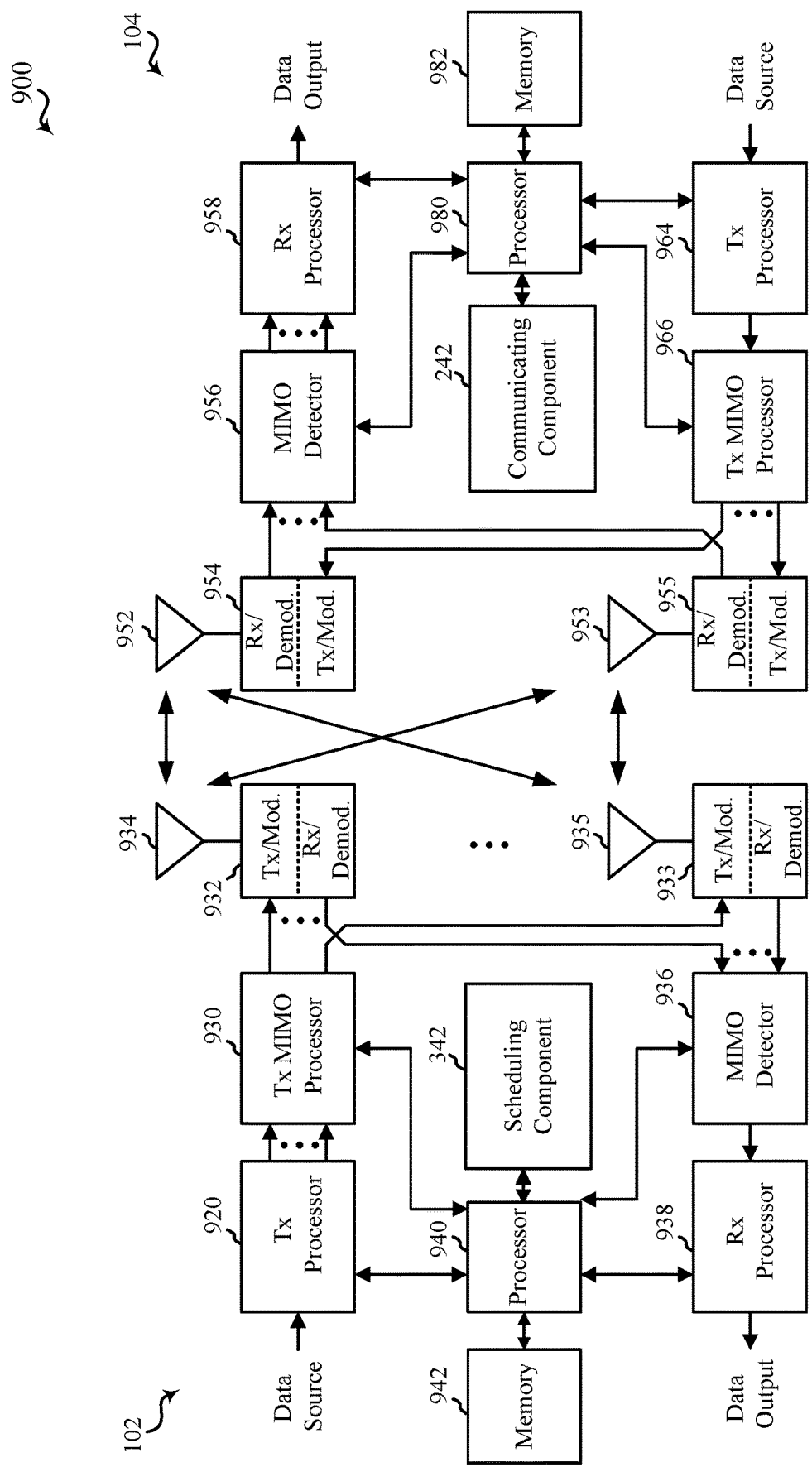
FIG. 9 is a block diagram illustrating an example of a MIMO communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method for wireless communication including determining a symbol length for an uplink channel transmission repetition is less than four symbols, determining, based on the symbol length, a DMRS pattern for transmitting DMRS with the uplink channel transmission repetition, and transmitting the uplink channel transmission repetition based on the DMRS pattern.

In Aspect 2, the method of Aspect 1 includes where determining the symbol length for the uplink channel transmission repetition is based on determining a definition of a number of symbols to use for the uplink channel transmission repetition and a symbol pattern defined for one or more slots.

In Aspect 3, the method of any of Aspects 1 or 2 includes where determining the DMRS pattern includes determining a subset of symbols allocated for the uplink channel transmission repetition to use for transmitting the DMRS.

In Aspect 4, the method of Aspect 3 includes where the symbol length is three symbols and determining the DMRS pattern includes determining the subset of symbols for transmitting the DMRS as a second symbol of the three symbols.

In Aspect 5, the method of any of Aspects 3 or 4 includes where the symbol length is two symbols and determining the DMRS pattern includes determining the subset of symbols for transmitting the DMRS as a first symbol or a second symbol of the two symbols.

In Aspect 6, the method of any of Aspects 1 to 5 includes where an uplink channel associated with the uplink channel transmission repetition is a physical uplink control channel or a physical uplink shared channel.

Aspect 7 is a method for wireless communication including receiving a configuration indicating a number of symbols for transmitting a number of uplink channel transmission repetitions in one or more slots, determining, based on the configuration and a slot configuration of the one or more slots, that a symbol length for an uplink channel transmission repetition is less than four symbol, and refraining, based on determining the symbol length is less than four symbols, from transmitting the uplink channel transmission repetition.

In Aspect 8, the method of Aspect 7 includes where determining that the symbol length is less than four symbols includes determining that the symbol length is one symbol, and where refraining from transmitting the uplink channel transmission repetition is based on determining that the symbol length is one symbol.

In Aspect 9, the method of any of Aspects 7 or 8 includes receiving a configuration indicating to refrain from transmitting uplink channel transmission repetitions that are less than four symbols, where refraining from transmitting the uplink channel transmission repetition is based on the configuration.

In Aspect 10, the method of any of Aspects 7 to 9 includes where an uplink channel associated with the uplink channel transmission repetition is a physical uplink control channel or a physical uplink shared channel.

Aspect 11 is a method for wireless communications including receiving a configuration indicating a number of symbols for transmitting a number of uplink channel transmission repetitions in one or more slots, determining, based on a slot configuration of the one or more slots, that a symbol length for an uplink channel transmission repetition in a first slot is less than four symbol, and based on determining the symbol length is less than four symbols, at least one of deferring transmitting at least a portion of the uplink channel transmission repetition, or transmitting at least a portion of the uplink channel transmission repetition in a super uplink slot.

In Aspect 12, the method of Aspect 11 includes receiving a configuration indicating to defer transmission of uplink channel transmission repetitions that are less than four symbols, where deferring transmitting at least the portion of the uplink channel transmission repetition is based on the configuration.

In Aspect 13, the method of any of Aspects 11 or 12 includes creating, based on determining the symbol length is less than four symbols, the super uplink slot by combining a set of uplink symbols across the first slot and a next slot.

In Aspect 14, the method of Aspect 13 includes where creating the super uplink slot includes combining the set of uplink symbols across the first slot and a next slot based on determining a consecutive set of symbols across the first slot and the next slot include only uplink symbols.

In Aspect 15, the method of Aspect 14 includes receiving a configuration indicating to create the super uplink slot using only consecutive uplink symbols, where creating the super uplink slot is based on the configuration.

In Aspect 16, the method of any of Aspects 11 to 15 includes creating the super uplink slot by combining a first set of uplink symbols in the first slot and a second set of uplink symbols in the first slot or a next slot based on determining one or more non-uplink symbols between the first set of uplink symbols and the second set of uplink symbols.

In Aspect 17, the method of Aspect 16 includes receiving a configuration indicating to create the super uplink slot regardless of whether downlink symbols are included, where creating the super uplink slot is based on the configuration.

In Aspect 18, the method of any of Aspects 11 to 17 includes where an uplink channel associated with the uplink channel transmission repetition is a physical uplink control channel or a physical uplink shared channel.

Aspect 19 is a method for wireless communication including transmitting a first configuration indicating a number of symbols for a number of uplink channel transmission repetitions in one or more slots, transmitting a second configuration indicating one or more parameters for determining symbols for transmitting an uplink channel transmission repetition where a symbol length for the uplink channel transmission repetition is determined to be less than four symbols, and receiving, based on the first configuration and the second configuration, the uplink channel transmission repetition.

In Aspect 20, the method of Aspect 19 includes where the second configuration indicates whether to drop or defer uplink channel transmission repetitions that are less than four symbols.

In Aspect 21, the method of any of Aspects 19 or 20 includes where the second configuration indicates whether to form a super uplink slot for uplink channel transmission repetitions using consecutive uplink symbols of multiple slots or non-consecutive uplink symbols of multiple slots.

In Aspect 22, the method of any of Aspects 19 to 21 includes where an uplink channel associated with the uplink channel transmission repetition is a physical uplink control channel or a physical uplink shared channel.

Aspect 23 is a method for wireless communication including generating, based on a symbol length for an uplink channel transmission repetition that is less than four symbols within a given slot, a DMRS pattern for transmitting DMRS with the uplink channel transmission repetition, and transmitting the uplink channel transmission repetition based on the DMRS pattern.

In Aspect 24, the method of Aspect 23 includes where the symbol length for the uplink channel transmission repetition within the given slot is based on a definition of a number of symbols to use for the uplink channel transmission repetition and a symbol pattern defined for one or more slots.

In Aspect 25, the method of any of Aspects 23 or 24 includes where the DMRS pattern includes a subset of symbols allocated for the uplink channel transmission repetition to use for transmitting the DMRS.

In Aspect 26, the method of Aspect 25 includes where the symbol length is three symbols and the DMRS pattern includes the subset of symbols for transmitting the DMRS as a second symbol of the three symbols.

In Aspect 27, the method of any of Aspects 25 or 26 includes where the symbol length is two symbols and the DMRS pattern includes the subset of symbols for transmitting the DMRS as a first symbol or a second symbol of the two symbols.

In Aspect 28, the method of any of Aspects 23 to 27 includes where an uplink channel associated with the uplink channel transmission repetition is a physical uplink control channel or a physical uplink shared channel.

Aspect 29 is a method for wireless communication including receiving a configuration indicating a number of symbols for transmitting a number of uplink channel transmission repetitions in one or more slots, and where, based on the configuration and a slot configuration of the one or more slots, a symbol length of one of the number of uplink channel transmission repetitions is less than four symbols, refraining from transmitting the one of the number of uplink channel transmission repetitions.

In Aspect 30, the method of Aspect 29 includes where the symbol length is one symbol, and wherein refraining from transmitting the one of the number of uplink channel transmission repetitions is based on the symbol length being one symbol.

In Aspect 31, the method of any of Aspects 29 or 30 includes receiving a configuration indicating to refrain from transmitting uplink channel transmission repetitions that are less than four symbols, where refraining from transmitting the one of the number of uplink channel transmission repetitions is based on the configuration.

In Aspect 32, the method of any of Aspects 29 to 31 includes where an uplink channel associated with the uplink channel transmission repetition is a physical uplink control channel or a physical uplink shared channel.

Aspect 33 is a method for wireless communications including receiving a configuration indicating a number of symbols for transmitting a number of uplink channel transmission repetitions in one or more slots, and where, based on the configuration and a slot configuration of the one or more slots, a symbol length for one of the number of uplink channel transmission repetitions in a first slot is less than four symbols, at least one of deferring transmitting at least a portion of the one of the number of uplink channel transmission repetitions, or transmitting at least a portion of the one of the number of uplink channel transmission repetitions in a super uplink slot.

In Aspect 34, the method of Aspect 33 includes receiving a configuration indicating to defer transmission of uplink channel transmission repetitions that are less than four symbols, where deferring transmitting at least the portion of the one of the number of uplink channel transmission repetitions is based on the configuration.

In Aspect 35, the method of any of Aspects 33 or 34 includes creating, based on the symbol length being less than four symbols, the super uplink slot by combining a set of uplink symbols across the first slot and a next slot.

In Aspect 36, the method of Aspect 35 includes where creating the super uplink slot includes combining the set of uplink symbols across the first slot and a next slot where a consecutive set of symbols across the first slot and the next slot includes only uplink symbols.

In Aspect 37, the method of Aspect 36 includes receiving a configuration indicating to create the super uplink slot using only consecutive uplink symbols, where creating the super uplink slot is based on the configuration.

In Aspect 38, the method of any of Aspects 33 to 37 includes creating the super uplink slot by combining a first set of uplink symbols in the first slot and a second set of uplink symbols in the first slot or a next slot where there are one or more non-uplink symbols between the first set of uplink symbols and the second set of uplink symbols.

In Aspect 39, the method of Aspect 38 includes receiving a configuration indicating to create the super uplink slot regardless of whether downlink symbols are included, where creating the super uplink slot is based on the configuration.

In Aspect 40, the method of any of Aspects 33 to 39 includes where an uplink channel associated with the number of uplink channel transmission repetitions is a physical uplink control channel or a physical uplink shared channel.

Aspect 41 is an apparatus for wireless communication including a transceiver, a memory configured to store instructions, and one or more processors communicatively coupled with the memory and the transceiver, where the one or more processors are configured to perform one or more of the methods of any of Aspects 1 to 40.

Aspect 42 is an apparatus for wireless communication including means for performing one or more of the methods of any of Aspects 1 to 40.

Aspect 43 is a computer-readable medium including code executable by one or more processors for wireless communications, the code including code for performing one or more of the methods of any of Aspects 1 to 40.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the memory and the transceiver, wherein the one or more processors are configured to:
   receive a configuration indicating a number of symbols for transmitting a number of uplink channel transmission repetitions in one or more slots; and
   where, based on the configuration and a slot configuration of the one or more slots, a symbol length for one of the number of uplink channel transmission repetitions in a first slot is less than four symbols:
   create a super uplink slot by combining a first set of uplink symbols in the first slot and a second set of uplink symbols in the first slot or a next slot where there are one or more non-uplink symbols between the first set of uplink symbols and the second set of uplink symbols; and
   transmit at least a portion of the one of the number of uplink channel transmission repetitions in the super uplink slot.

2. The apparatus of claim 1, wherein the one or more processors are further configured to create, based on the symbol length being less than four symbols, the super uplink slot by combining a set of uplink symbols across the first slot and a next slot.

3. The apparatus of claim 1, wherein the one or more processors are further configured to receive a configuration indicating to create the super uplink slot regardless of whether downlink symbols are included, wherein the one or more processors are configured to create the super uplink slot based on the configuration.

4. The apparatus of claim 1, wherein an uplink channel associated with the number of uplink channel transmission repetitions is a physical uplink control channel or a physical uplink shared channel.

5. A method for wireless communications, comprising:
   receiving a configuration indicating a number of symbols for transmitting a number of uplink channel transmission repetitions in one or more slots; and
   where, based on the configuration and a slot configuration of the one or more slots, a symbol length for one of the number of uplink channel transmission repetitions in a first slot is less than four symbols:
   creating a super uplink slot by combining a first set of uplink symbols in the first slot and a second set of uplink symbols in the first slot or a next slot where there are one or more non-uplink symbols between the first set of uplink symbols and the second set of uplink symbols; and
   transmitting at least a portion of the one of the number of uplink channel transmission repetitions in the super uplink slot.

6. The method of claim 5, further comprising creating, based on the symbol length being less than four symbols, the super uplink slot by combining a set of uplink symbols across the first slot and a next slot.

7. The method of claim 5, further comprising receiving a configuration indicating to create the super uplink slot regardless of whether downlink symbols are included, wherein creating the super uplink slot is based on the configuration.

8. The method of claim 5, wherein an uplink channel associated with the number of uplink channel transmission repetitions is a physical uplink control channel or a physical uplink shared channel.

* * * * *